United States Patent [19]

Komatsu

[11] Patent Number: 4,480,866
[45] Date of Patent: Nov. 6, 1984

[54] VEHICLE FOR DISPLAYING GOODS

[75] Inventor: Shiro Komatsu, Osaka, Japan

[73] Assignee: Fujikin International, Inc., Osaka, Japan

[21] Appl. No.: 449,990

[22] Filed: Dec. 15, 1982

[30] Foreign Application Priority Data

Dec. 15, 1981 [JP] Japan .......................... 56-187300[U]

[51] Int. Cl.³ .............................................. B60R 13/00
[52] U.S. Cl. ........................................ 296/21; 296/26; 296/171; 296/175
[58] Field of Search .................... 296/21, 26, 171, 172, 296/175, 176; 312/114, 278; 108/32; 211/135

[56] References Cited

U.S. PATENT DOCUMENTS

| | | | |
|---|---|---|---|
| 1,964,894 | 7/1934 | Rohne | 296/26 |
| 2,820,666 | 1/1958 | Grochmal | 296/171 |
| 2,965,412 | 12/1960 | Henderson et al. | 296/171 |
| 3,341,986 | 9/1967 | Brasig | 296/26 |

Primary Examiner—Robert R. Song
Attorney, Agent, or Firm—Armstrong, Nikaido, Marmelstein, & Kubovcik

[57] ABSTRACT

A vehicle for displaying goods comprises a main body having opposite side walls and a display subbody provided toward at least one of the side walls. The subbody is open toward the interior of the main body and internally provided with a display rack. By a hydraulic cylinder, the subbody can be held in a position projected outward beyond the side wall of the main body when giving a display but, during running, is housed in the main body with its side wall substantially flush with the main body side wall.

4 Claims, 5 Drawing Figures

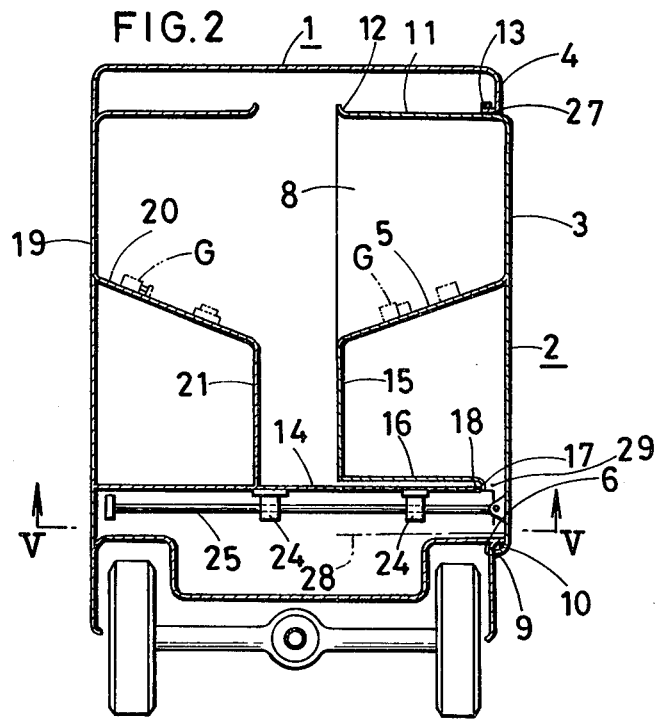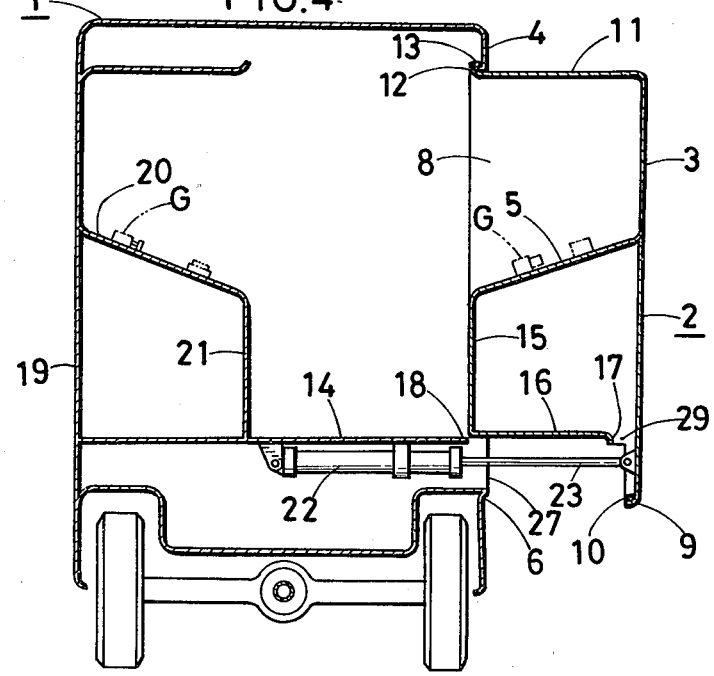

VEHICLE FOR DISPLAYING GOODS

BACKGROUND OF THE INVENTION

The present invention relates to a vehicle for displaying articles of merchandise or goods, and more particularly to a vehicle which freely travels from a place of production of goods to another place where the goods are to be displayed to provide a site of exhibiting the goods with its interior space made larger than during travel.

When it is desired to display goods in a region away from the place of production thereof, the dealer usually transports the goods to a site of display hired in that region. This method of display requires much labor and cost for packing and unpacking the articles for transport to and from the site, for placing the articles on display at the site and clearing them away and for loading the articles into a transport vehicle and unloading.

SUMMARY OF THE INVENTION

To overcome the above problem, the present invention provides a vehicle for displaying goods which comprises a main body having opposite side walls and a display subbody provided toward at least one of the side walls, the subbody being open toward the interior of the main body and internally provided with a display rack, the subbody being holdable in a position projected outward beyond the side wall of the main body when giving a display and adapted to be housed in the main body with its side wall substantially flush with the main body side wall during running.

Although the goods displaying vehicle of the invention is in no way different from usual transport vehicles when transporting goods, the display subbody is projectable from the vehicle main body to provide an increased floor space for use as a suitable site of display in the interior of the vehicle. Accordingly goods can be displayed as initially arranged on the interior display rack without necessitating the cumbersome procedures to be followed every time goods are displayed, such as packing and unpacking for transporting the goods to and from the site of display, placing the goods on display at the site and clearing them away, and loading them into a transport vehicle and unloading. This greatly reduces the expenditure for the display. The vehicle of the invention is very convenient because it carries goods to any place or to any region where no suitable site of display is available, whereupon the vehicle itself serves as a display site in the manner described above.

The present invention will be described below in greater detail with reference to the accompanying drawings.

BRIEF DESCRIPTION OF THE DRAWINGS

FIG. 2 is an enlarged view in section taken along the line II—II in FIG. 1;

FIG. 4 is an enlarged view in section taken along the line IV—IV in FIG. 3; and

DESCRIPTION OF THE PREFERRED EMBODIMENTS

Figure 1:
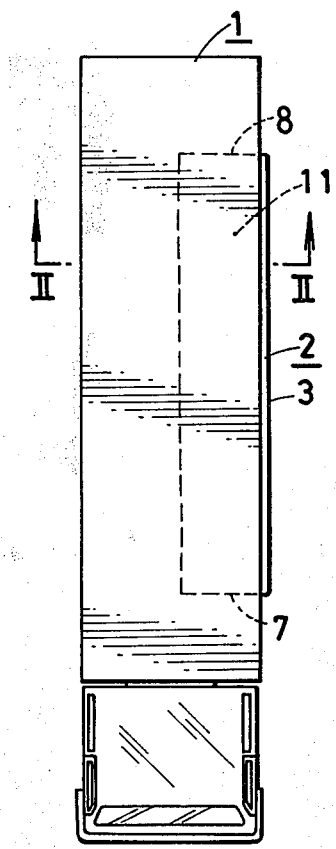
FIG. 1 is a plan view showing an embodiment of the invention while it is transporting goods.

With reference to FIG. 1 to FIG. 4, a vehicle for displaying goods includes a main body 1 having opposite side walls 4 and 19 and a display subbody 2 provided toward one of the side walls, 4. The subbody 2 has a front wall 7, a rear wall 8, an upper wall 11 and a side wall 3 and is lateral U-shaped in horizontal section and inverted L-shaped in vertical section. The subbody 2 is open toward the interior of the main body 1 and is internally provided with a display rack 5. When giving a display, the subbody 2 can be held in a position projected outward beyond the side wall 4 of the main body 1. During running, the subbody 2 is housed in the main body 1, with its side wall 3 substantially flush with the side wall 4 of the main body 1. The main body side wall 4 is formed with a rectangular cutout 27 for moving the subbody 2 into and out of the main body therethrough and with a downward stepped portion 6 at the lower edge thereof defining the cutout 27. The inner ends of the subbody front wall 7, rear wall 8 and upper wall 11 are formed with a bent edge 12 adapted to hermetically bear against the cutout defining inner edge of the main body side wall 4, with a packing 13 provided between the edges, when the subbody 2 is moved outward. The side wall 3 of the subbody 2 extends downward slightly beyond its front and rear walls 7 and 8, and the lower end of the side wall 3 is formed with a bent edge 9 adapted to hermetically bear against the downward stepped portion 6 with a packing 10 provided therebetween. With the present embodiment, the former packing 13 is fixed to the upper side of the inner edge of the side wall 4 slightly projecting inward and extending along the front side, rear side and upper side of the rectangular cutout 27, while the latter packing 10 is fixed to the upper side of the bent edge 9 of the side wall 3. Alternatively, however, the former packing 13 may be attached to the subbody 2, and the latter packing 10 to the main body 1.

The display rack 5 extends from the side wall 3 toward the center of the width of the main body 1 as inclined downward. A vertical wall 15 extends from the lower end of the inclined rack to a position a small distance above the floor 14 of the main body 1. A horizontal wall 16 extends from the lower end of the vertical wall 15 toward the subbody side wall 3 to a position a small distance inward of the side wall 3. The floor 14 of the main body 1 has a free edge 18 to provide a clearance 29 between the floor 14 and the side wall 3. The outer end of the horizontal wall 16 is formed with a bent edge 17 adapted to bear against the free edge 18 of the floor 14 from outside when the subbody 2 is housed in the main body 1. The other side wall 19 of the main body 1 is also provided with a display rack 20 symmetric with the display rack 5 of the subbody 2. More specifically the rack 20 is inclined downward toward the center of the width of the main body 1 so that the goods G to be arranged on the rack can be seen readily. A vertical wall 21 extends from the lower end of the inclined rack 20 to the floor 14 of the main body 1.

Figure 5:
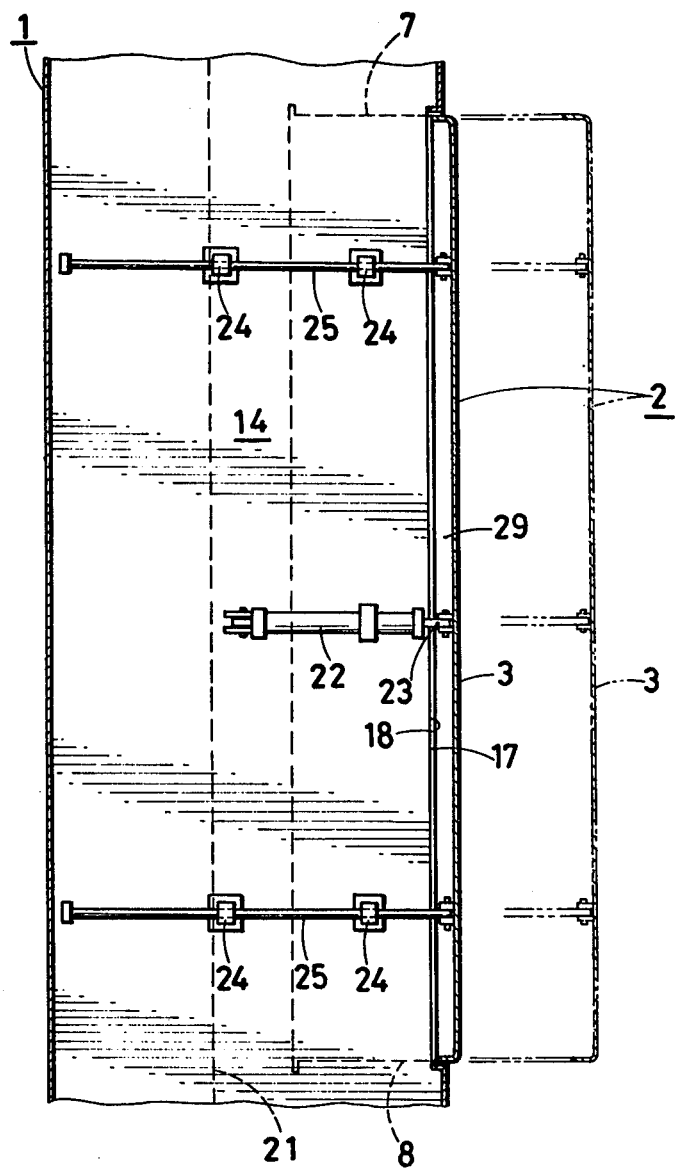
FIG. 5 is a view in section taken along the line V—V in FIG. 2.

The vehicle is provided with means for automatically moving the subbody 2 into and out of the main body 1 as will be described below in detail with reference to FIGS. 2 and 5. A hydraulic cylinder 22 extending toward the side wall 3 of the subbody 2 is fixed to the underside of the floor 14 at the midportion of its length. The cylinder 22 has a piston rod 23 the forward end of which is connected to the side wall 3. Two slide bearings 24 arranged side by side are attached to the underside of the floor 14 at each of its front and rear ends. Two guide bars 25 supported by the pairs of slide bearings 24 are connected, each at its one end, to the side wall 3.

When the vehicle transports goods, the display subbody 2 is housed in the main body 1 with the side wall 3 substantially flush with the side wall 4 of the main body 1 as seen in FIGS. 1 and 2, so that the vehicle is similar to usual transport vehicles.

Figure 3:
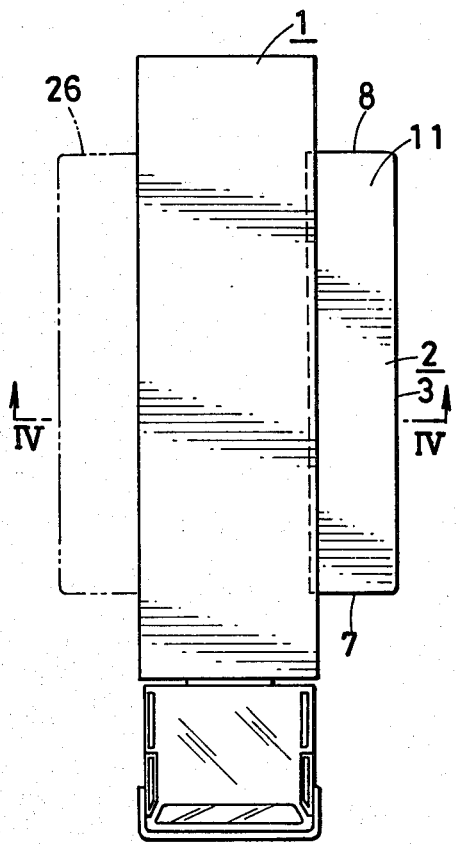
FIG. 3 is a plan view showing the vehicle of FIG. 1 while displaying goods.

When the vehicle arrives at the destination for a display, the hydraulic cylinder 22 is operated to extend the piston rod 23 and thereby push out the subbody 2 from the main body 1 to a position as projected therefrom as shown in FIGS. 3 and 4. At this time, it is preferable to interpose a removable support leg between the horizontal wall 16 below the display rack 5 and the ground. Whereas the opposed display racks 20 and 5 are positioned close to each other even without a passage on the floor 14 during the transport of the goods (see FIG. 2), the outward projection of the subbody 2 increases the space between the display racks 20 and 5 to form a sufficient passageway to render the interior of the vehicle serviceable as a display site (see FIG. 4). When the display is over, the hydraulic cylinder 22 is operated to retract the piston rod 23, whereby the subbody 2 is returned and accommodated in the main body 1.

Although the display subbody 2 is provided alongside only one of the side walls 4 and 19 of the main body according to the foregoing embodiment, the display subbody 2 may be provided toward each of the side walls. In this case, another display subbody 26 is disposed symmetrically with the subbody 2 as indicated in a phantom line in FIG. 3, with the lower portion of the display rack 20 designed to have the same construction as the rack 5 opposed thereto. The display subbody 2 may be provided with a lower wall 28 as indicated in a phantom line in FIG. 2. The means for automatically moving the subbody into and out of the main body is not limited to the hydraulic cylinder; a motor-driven pinion-rack or pantograph mechanism is similarly useful.

What is claimed is:
1. A vehicle for displaying goods comprising:
   a main body having opposite side walls, and a floor and,
   a display subbody provided toward at least one of the side walls, the subbody being open toward the interior of the main body and internally provided with a display rack,
   the subbody being holdable in a position projected outward beyond the side wall of the main body when giving a display and adapted to be housed in the main body with its side wall substantially flush with the main body side wall during running, wherein
   the display rack extends from the subbody side wall to the center of width of the main body as inclined downward, a vertical wall extends from the lower end of the inclined rack to a position a small distance above the floor of the main body, and a horizontal wall extends from the lower end of the vertical wall toward the subbody side wall to a position a small distance inward of the side wall,
   the floor of the main body has a free edge to provide clearance between the floor and the subbody side wall, and an outer end of the horizontal wall is formed with a bent edge adapted to bear against the free edge of the floor from outside when the subbody is housed in the main body.

2. A vehicle as defined in claim 1 wherein the subbody has a front wall, a rear wall, an upper wall and the side wall and is lateral U-shaped in horizontal section and inverted L-shaped in vertical section.

3. A vehicle as defined in claim 2 wherein the main body side wall is formed with a rectangular cutout for moving the subbody into and out of the main body therethrough and with a downward stepped portion at the lower edge thereof defining the cutout, the inner ends of the subbody front wall, rear wall and upper wall being formed with a bent edge adapted to hermetically bear against the cutout defining inner edge of the main body side wall with a packing provided between the edges when the subbody is moved out, the lower end of the subbody side wall being formed with a bent edge adapted to bear against the downward stepped portion with a packing provided therebetween, each of the packings being fixed to one of the main body and the subbody.

4. A vehicle as defined in claim 1, further comprising a means for automatically moving the subbody into and out of the main body which comprises a hydraulic cylinder fixed to the underside of the floor of the main body and having a piston rod, the forward end of the piston rod being connected to the inner surface of the subbody side wall.

* * * * *